United States Patent
Arzt et al.

(10) Patent No.: US 10,570,242 B2
(45) Date of Patent: Feb. 25, 2020

(54) AQUEOUS POLYURETHANE DISPERSION

(71) Applicant: Allnex Austria GmbH, Werndorf (AT)

(72) Inventors: Anton Arzt, Neu-Tillmitsch (AT); Robert Harrer, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 51 days.

(21) Appl. No.: 16/081,174

(22) PCT Filed: Apr. 13, 2017

(86) PCT No.: PCT/EP2017/059005
§ 371 (c)(1),
(2) Date: Aug. 30, 2018

(87) PCT Pub. No.: WO2017/182393
PCT Pub. Date: Oct. 26, 2017

(65) Prior Publication Data
US 2019/0077902 A1  Mar. 14, 2019

(30) Foreign Application Priority Data

Apr. 20, 2016 (EP) .................................. 16166270

(51) Int. Cl.
| | | |
|---|---|---|
| *C08G 18/12* | (2006.01) | |
| *C08G 18/10* | (2006.01) | |
| *C08L 75/06* | (2006.01) | |
| *C09D 175/06* | (2006.01) | |
| *C08G 18/66* | (2006.01) | |
| *C08G 18/67* | (2006.01) | |
| *C08G 18/75* | (2006.01) | |
| *C08G 18/76* | (2006.01) | |
| *C08G 18/32* | (2006.01) | |
| *C08G 18/34* | (2006.01) | |
| *C08G 18/44* | (2006.01) | |

(52) U.S. Cl.
CPC ............ *C08G 18/12* (2013.01); *C08G 18/10* (2013.01); *C08G 18/3206* (2013.01); *C08G 18/348* (2013.01); *C08G 18/44* (2013.01); *C08G 18/6659* (2013.01); *C08G 18/6755* (2013.01); *C08G 18/755* (2013.01); *C08G 18/765* (2013.01); *C08L 75/06* (2013.01); *C09D 175/06* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 3,412,054 A | 11/1968 | Milligan | |
| 3,640,924 A | 2/1972 | Trimble | |
| 7,157,519 B2 | 1/2007 | Schafheutle et al. | |
| 2006/0293468 A1 | 12/2006 | Rische et al. | |
| 2011/0045219 A1* | 2/2011 | Stewart | C03C 17/322 428/34.7 |
| 2012/0269974 A1* | 10/2012 | Arzt | C08G 18/0823 427/358 |
| 2014/0356561 A1* | 12/2014 | Ekin | C08G 18/6659 428/34.7 |
| 2015/0064476 A1 | 3/2015 | Kanda | |

FOREIGN PATENT DOCUMENTS

| | | |
|---|---|---|
| DE | 3644371 | 12/1986 |
| DE | 10 2005 029 626 | 1/2007 |
| EP | 1 493 950 | 1/2005 |
| EP | 2 493 590 | 5/2011 |
| EP | 2 835 404 | 2/2015 |
| WO | 2011/051359 | 5/2011 |
| WO | 2013/006606 | 1/2013 |

OTHER PUBLICATIONS

International Search Report dated Jun. 27, 2017 in International Application No. PCT/EP2017/059005.
Written Opinion of the International Searching Authority dated Jun. 27, 2017 in International Application No. PCT/EP2017/059005.

* cited by examiner

*Primary Examiner* — Vu A Nguyen
(74) *Attorney, Agent, or Firm* — Wenderoth, Lind & Ponack, L.L.P.

(57) ABSTRACT

The invention relates to an aqueous polyurethane dispersion U comprising at least two aqueously dispersed polyurethanes whereof at least one is an aqueously dispersible polyurethane U1 having a mass-average molar mass Mw1 of at least 10 kg/mol, and at least one is an aqueously dispersible polyurethane U2 having a mass-average molar mass Mw2 of less than 10 kg/mol, a process for the preparation thereof, and a method of use thereof.

19 Claims, No Drawings

AQUEOUS POLYURETHANE DISPERSION

FIELD OF THE INVENTION

The invention relates to an aqueous polyurethane dispersion. It further relates to a process of preparation thereof, and a method of use of the dispersion thus prepared.

BACKGROUND OF THE INVENTION

Aqueous polyurethane dispersions are widely used as binders for aqueous paints. Among these paints, one pack systems are known which dry physically by evaporation of water, the film formation optionally being supported by addition of thermally activated crosslinking agents such as melamine formaldehyde crosslinker resins or blocked isocyanates which initiate curing at temperatures above 100° C.; and also two pack systems, where hydroxy-functional binder constituents are mixed with nonblocked isocyanates immediately prior to application, and the crosslinking reaction takes place at room temperature (or at a slightly elevated temperature in order to accelerate the cure).

Physically drying polyurethane dispersions are obtained, conventionally, by chain extending an isocyanate-functional prepolymer in the aqueous phase by means of polyfunctional compounds of low molar mass dissolved in water, referred to as chain extenders, such as diamines or dihydrazides which react with the isocyanate groups of the prepolymer.

Coatings obtained from aqueous systems comprising high molar mass polyurethanes with a mass average molar mass in excess of 20 kg/mol, measured as polystyrene equivalent mass, have been disclosed in U.S. Pat. No. 7,157,519 B2. Preferred polyols used therein are polyether polyols and polyester polyols. According to EP 1 493 950 B1, hardness, chemical and solvent resistance can be improved when choosing a polyurethane having a specific amount of substance of hydroxyl groups, —OH, of at least 0.6 mol/kg, a degree of branching measured as specific amount of substance of tertiary and/or quaternary aliphatic carbon atoms of from 0.01 mol/kg to 0.5 mol/kg, wherein the tertiary and quaternary carbon atoms are derived from trivalent and tetravalent alcohols, and additionally at least one of a specific amount of urea groups >N—CO—N< (formula I) in the polyurethane of from 0.8 mol/kg to 2 mol/kg, and a specific amount of substance of hydroxyl groups, —OH, of from 1 mol/kg to 4 mol/kg.

Although very good mechanical, and chemical resistance properties have been realised, adhesion of the coating to substrates may still be improved. It was therefore the object of this invention to provide a coating composition based on an aqueously dispersed polyurethane system that leads to coating films having good mechanical and chemical resistance, with improved adhesion on substrates coated therewith, particularly on plastic substrates.

SUMMARY OF THE INVENTION

This object has been realised by an aqueous polyurethane dispersion U comprising at least two aqueously dispersed polyurethanes whereof at least one is an aqueously dispersible polyurethane U1 having a mass-average molar mass $M_{w1}$ of at least 10 kg/mol, and at least one is an aqueously dispersible polyurethane U2 having a mass-average molar mass $M_{w2}$ of less than 10 kg/mol, a specific amount of substance of hydroxyl groups n(—OH)/m(U2) of from 1.4 mol/kg to 4 mol/kg, a degree of branching of up to 0.5 mol/kg, and a specific amount of substance of urea groups n(—NH—CO—NH—)/m (U2) of from 0.8 mol/kg to 2 mol/kg, wherein hydroxy-functional polycarbonates of formula III

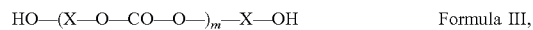

HO—(X—O—CO—O—)$_m$—X—OH          Formula III, are used in the synthesis of U1 and U2, where X is a linear, branched or cyclic alkylene group, and m is an integer number, and the number average molar mass $M_n$ of the hydroxy-functional polycarbonate of formula III is at least 400 g/mol, and the mass fraction w(A')$_1$ of polyols A' other than hydroxy-functional polycarbonates A1 in the polyols used in the synthesis of U1 and the mass fraction w(A')$_2$ of polyols A' other than hydroxy-functional polycarbonates A2 in the polyols used in the synthesis of U2 are w(A')$_1$=m(A')/[m(A')+m(A1)]≤2%, and w(A')$_2$=m(A')/[m(A')+m(A2)]≤2%, where m(A') is the mass of polyols A', m(A1) is the mass of polyols A1, and m(A2) is the mass of polyols A2.

Molar masses of polymeric substances and weighted averages thereof including number-average molar mass and mass-average molar mass have been determined on solutions in tetrahydrofuran by size exclusion chromatography, also referred to as gel permeation chromatography, using polystyrene standards.

The invention is also directed to an aqueous two-pack coating composition which comprises at least one aqueous polyurethane dispersion U comprising at least two aqueously dispersed polyurethanes whereof at least one is an aqueously dispersible polyurethane U1 having a mass-average molar mass $M_{w1}$ of at least 10 kg/mol, and at least one is an aqueously dispersible polyurethane U2 having a mass-average molar mass $M_{w2}$ of less than 10 kg/mol, a specific amount of substance of hydroxyl groups n(—OH)/m(U2) of from 1.4 mol/kg to 4 mol/kg, a degree of branching of up to 0.5 mol/kg, and a specific amount of substance of urea groups n(—NH—CO—NH—)/m (U2) of from 0.8 mol/kg to 2 mol/kg, wherein hydroxy-functional polycarbonates of formula III

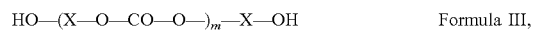

HO—(X—O—CO—O—)$_m$—X—OH          Formula III, are used in the synthesis of U1 and U2, where X is a linear, branched or cyclic alkylene group, and m is an integer number, and the number average molar mass $M_n$ of the hydroxy-functional polycarbonate of formula III is at least 400 g/mol, and the mass fraction w(A')$_1$ of polyols A' other than hydroxy-functional polycarbonates A1 in the polyols used in the synthesis of U1 and the mass fraction w(A')$_2$ of polyols A' other than hydroxy-functional polycarbonates A2 in the polyols used in the synthesis of U2 are w(A')$_1$=m(A')/[m(A')+m(A1)]≤2%, and w(A')$_2$=m(A')/[m(A')+m(A2)]≤2%, where m(A') is the mass of polyols A', m(A1) is the mass of polyols A1, and m(A2) is the mass of polyols A2, and a crosslinker X therefor which is a multifunctional isocyanate crosslinker which may also be hydrophilically modified.

The invention is further directed to an aqueous polyurethane dispersion U comprising at least two aqueously dispersed polyurethanes whereof at least one is an aqueously dispersible polyurethane U1 having a mass-average molar mass $M_{w1}$ of at least 10 kg/mol, and at least one is an aqueously dispersible polyurethane U2 having a mass-average molar mass $M_{w2}$ of less than 10 kg/mol, a specific amount of substance of hydroxyl groups n(—OH)/m(U2) of from 1.4 mol/kg to 4 mol/kg, a degree of branching of up to 0.5 mol/kg, and a specific amount of substance of urea groups n(—NH—CO—NH—)/m (U2) of from 0.8 mol/kg to 2 mol/kg, wherein hydroxy-functional polycarbonates of formula III

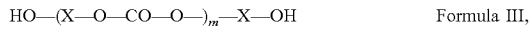
HO—(X—O—CO—O—)$_m$—X—OH     Formula III, are used in the synthesis of U1 and U2, where X is a linear, branched or cyclic alkylene group, and m is an integer number, and the number average molar mass $M_n$ of the hydroxy-functional polycarbonate of formula III is at least 400 g/mol, and the mass fraction $w(A')_1$ of polyols A' other than hydroxy-functional polycarbonates A1 in the polyols used in the synthesis of U1 and the mass fraction $w(A')_2$ of polyols A' other than hydroxy-functional polycarbonates A2 in the polyols used in the synthesis of U2 are $$w(A')_1 = m(A')/[m(A')+m(A1)] \leq 2\%, \text{ and } w(A')_2 = m(A')/[m(A')+m(A2)] \leq 2\%,$$

where m(A') is the mass of polyols A', m(A1) is the mass of polyols A1, and m(A2) is the mass of polyols A2, and a crosslinker X1 therefor which is selected from the group consisting of blocked multifunctional isocyanates, and aminoplast crosslinkers which are optionally etherified adducts from a multifunctional amide or amidine and an aldehyde.

DETAILED DESCRIPTION OF THE PREFERRED EMBODIMENTS

Aqueously dispersible polyurethanes are such polyurethanes that comprise hydrophilic moieties within the molecules, such as anionic groups, nonionic hydrophilic groups, or cationic groups in an amount to stabilise the dispersion against coagulation. Frequently, anionic groups derived from organic hydroxycarboxylic acids, or organic amino-sulfonic acids are incorporated into the polyurethane polymer chain by reaction of these acids, via their hydroxyl or amino groups, with multifunctional isocyanates, i. e. isocyanates having more than one reactive isocyanate group, under formation of urethane or urea bonds. Preferred nonionic hydrophilic groups are polymeric oxyethylene groups —O—(CH$_2$—CH$_2$—O)$_n$— where n is preferably more than 5, derived from polyoxyethylenes, which are incorporated into the polyurethane by reaction of their terminal hydroxyl groups with multifunctional isocyanates under formation of urethane bonds.

In a preferred embodiment, at least one of the said aqueously dispersible polyurethanes has a specific amount of substance of acid and/or acid anion groups of from 0.1 mol/kg to 1.8 mol/kg.

In a further preferred embodiment, at least one of the said aqueously dispersible polyurethanes has a mass fraction of oligo-oxyethylene groups of from 1% to 25%, wherein oligo-oxyethylene groups obey the formula II: —O—(CH$_2$—CH$_2$—O—)$_n$—CH$_2$—CH$_2$—O—, wherein n is preferably from 4 to 100.

In a further preferred embodiment, at least one of the said aqueously dispersible polyurethanes has a mass fraction of oligo-oxyethylene groups of from 1% to 25%, wherein the oligo-oxyethylene groups obey the formula II: —O—(CH$_2$—CH$_2$—O—)$_n$—CH$_2$—CH$_2$—O—, wherein n is preferably from 4 to 100, and a specific amount of substance of acid and/or acid anion groups of from 0.1 mol/kg to 1.8 mol/kg.

Polyurethanes having only anionic groups are particularly preferred.

It is preferred that in the hydroxy-functional polycarbonate A of formula III:

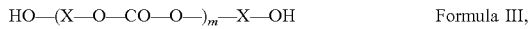
HO—(X—O—CO—O—)$_m$—X—OH     Formula III,

X is a linear, branched or cyclic alkylene group having preferably from four to fourteen carbon atoms, and m is an integer number and is preferably from four to thirty. Particularly preferably, the alkylene group has from six to twelve carbon atoms, and m is from five to twenty-five. The number average molar mass $M_n$ of the polycarbonate A is at least 400 g/mol, and preferably from 500 g/mol to 5000 g/mol, in particular from 800 g/mol to 2000 g/mol.

Particularly preferred alkylene groups X are hexane-1,6-diyl, octene-1,8-diyl, decene-1,10-diyl, dodecene-1,12-diyl, cyclohexane-1,2-diyl, cyclohexane-1,3-diyl, and cyclohexane-1,4-diyl, and mixtures of these. The hydroxy-functional polycarbonates A1 of formula III used in the synthesis of U1 and the hydroxy-functional polycarbonates A2 of formula III used in the synthesis of U2 may be the same for U1 and U2 (A1=A2), or they may be different (A1≠A2), but are both selected from the polycarbonates as defined for A in formula III. The best results have been obtained when only polycarbonate diols A have been used as polymeric diols in making polyurethanes U1 and U2. Replacing more than 2% of the mass of the polycarbonate diols by other polymeric diols commonly used in the art, such as polyester diols, polyether diols, acrylic polyols or others, leads to impaired adhesion on plastic substrates such as those based on thermoplastic blends of polycarbonates and acrylonitrile-butadiene-styrene terpolymers.

The at least one aqueously dispersible polyurethane U1 has a mass-average molar mass $M_{w1}$ of at least 10 kg/mol, preferably at least 15 kg/mol, and particularly preferred, at least 20 kg/mol. It has preferably an acid number of from 8 mg/g to 40 mg/g, more preferred, from 12 mg/g to 30 mg/g, and a hydroxyl number of from 0 mg/g to 50 mg/g, more preferred from 2 mg/g to 30 mg/g.

The at least one aqueously dispersible polyurethane U2 has a mass-average molar mass $M_{w2}$ of less than 10 kg/mol, preferably less than 8 kg/mol, a specific amount of substance of hydroxyl groups n(—OH)/m(U2) of the polyurethane polymer U2 of from 1 mol/kg to 4 mol/kg, preferably from 1.4 mol/kg to 3.5 mol/kg. It has further a degree of branching of up to 0.5 mol/kg, preferably from 0.2 mol/kg to 0.33 mol/kg, and a specific amount of substance of urea groups n(—NH—CO—NH—)/m (U2) of from 0.8 mol/kg to 2.0 mol/kg, preferably from 1.0 mol/kg to 1.8 mol/kg.

The aqueous polyurethane dispersion U comprising at least two aqueously dispersed polyurethanes whereof at least one is an aqueously dispersible polyurethane U1, and at least one is an aqueously dispersible polyurethane U2 as detailed hereinabove can be made by mixing the separate dispersions of U1 and U2. The mixing ratio is preferably such that the mass fraction w(U2)=m(U2)/[m(U1)+m(U2)] of the polyurethane U2 in the mixture of the dispersions of U1 and U2 is between 0.50 kg/kg and 0.80 kg/kg, where m(U1) is the mass of polyurethane U1 in the mixture of the dispersions, and m(U2) is the mass of polyurethane U2 in the mixture of the dispersions. It has been found in the experiments on which this invention is based that at a mass fraction w(U2)<50%, the chemical resistance of coatings made with the aqueous polyurethane dispersion U is impaired, whereas the adhesion to substrates, particularly those comprising blends of ABS (acrylonitrile-butadiene-styrene terpolymer) and PC (polycarbonate based on bisphenol A), suffers for a mass fraction w(U2)>80%. Particularly preferred ranges are therefore 0.55 kg/kg≤w(U2)≤0.78 kg/kg, especially 0.60 kg/kg≤w(U2)≤0.77 kg/kg, and most preferably 0.65 kg/kg≤w(U2)≤0.75 kg/kg.

The invention is also directed to a process for the preparation of the aqueous of dispersion of polyurethane U1 of the invention comprising the steps of (a1)—providing a hydroxy-functional polycarbonate A1 as defined hereinabove, (b1)—mixing the polycarbonate A1 with a polyhydric alcohol E1 having at least two hydroxyl groups per molecule, and a molar mass of less than 400 g/mol, and either or both of an organic acid B11 which is selected from the group consisting of hydroxy-functional organic acids and amino-functional organic acids, and a hydrophilic polyether B2, wherein the acid B11 has at least one, and preferably two, hydroxyl or primary or secondary amino groups and at least one acid group, and wherein the hydrophilic polyether B2 has moieties derived from oxyethylene groups obeying the formula II

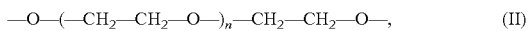

$$-O-(-CH_2-CH_2-O-)_n-CH_2-CH_2-O-, \quad (II)$$

wherein n is from 1 to 100, and at least one, preferably two hydroxyl groups, (c11)—reacting the mixture prepared in step (b1) at an elevated temperature of preferably from 60° C. to 110° C., with at least one multifunctional isocyanate C1 having at least two isocyanate groups per molecule, wherein the amount of multifunctional isocyanate C1 is chosen such that there is a ratio of isocyanate groups in C1 to hydroxyl groups present in the mixture prepared in step (b1) of preferably from 2:1 to 1.1:1, until preferably at least 90% of the hydroxyl groups of the mixture prepared in step (b1) are consumed by reaction with the multifunctional isocyanate C1, (d11)—adding to the cooled reaction product of step (c11) a base N1 if an acid B11 was used in step (b1), in an amount of substance sufficient to neutralise at least 50% of the acid groups of the acid B11 used, dispersing the resultant mixture in water, adding immediately thereafter, a chain extender G1 selected from the group consisting of aliphatic diamines G1a and aliphatic dihydrazides G1b, reacting this mixture until consumption of the remaining reactive isocyanate groups, and reactive groups of the chain extender G1, and homogenising under cooling to room temperature (23° C.), wherein the amounts of the reactants A1, B11, B2, C1, G1a, G1b, and N1 are chosen such that the resultant polyurethane U1 has a mass-average molar mass $M_{w1}$ of at least 10.0 kg/mol.

In another embodiment, the preparation of the aqueous of dispersion of polyurethane U1 of the invention comprises the steps of (a1)—providing a hydroxy-functional polycarbonate A1 as defined hereinabove, (b1)—mixing the polycarbonate A1 with a polyhydric alcohol E1 having at least two hydroxyl groups per molecule, and a molar mass of less than 400 g/mol, and either or both of an organic acid B11 which is selected from the group consisting of hydroxy-functional organic acids and amino-functional organic acids, and a hydrophilic polyether B2, wherein the acid B11 has at least one, and preferably two, hydroxyl or primary or secondary amino groups and at least one acid group, and wherein the hydrophilic polyether B2 has moieties derived from oxyethylene groups obeying the formula II

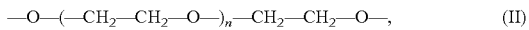

$$-O-(-CH_2-CH_2-O-)_n-CH_2-CH_2-O-, \quad (II)$$

wherein n is from 1 to 100, and at least one, preferably two hydroxyl groups, (c12)—reacting the mixture prepared in step (b1) at an elevated temperature of preferably from 60° C. to 150° C., with at least one multifunctional isocyanate C1 having at least two isocyanate groups per molecule, wherein the amount of multifunctional isocyanate C1 is chosen such that there is a ratio of isocyanate groups in C1 to hydroxyl groups present in the mixture prepared in step (b1) of preferably from 1.7:1 to 1.1:1, more preferably from 1.5:1 to 1.05:1, until preferably at least 90% of the hydroxyl groups of the mixture prepared in step (b1) are consumed by reaction with the multifunctional isocyanate C1, (d12)—adding to the cooled reaction product of step (c12) a mixture of olefinically unsaturated monomers M which mixture comprises at least one olefinically unsaturated monomer M1 which is an ester of an olefinically unsaturated carboxylic acid M11 having from three to six carbon atoms and at least one carboxylic acid group, and a linear or branched aliphatic alcohol M12 having from one to fifteen carbon atoms, and at least one hydroxyfunctional olefinically unsaturated monomer M2 which is preferably an ester of one mole of an olefinically unsaturated carboxylic acid M21 having from three to six carbon atoms and at least one carboxylic acid group, and one mole of a linear or branched aliphatic alcohol M22 having from one to fifteen carbon atoms, and at least two hydroxyl groups, homogenising the mixture thus obtained, and adding thereto a further quantity of an isocyanate component C2, which may be different from, or may be the same as, C1, and reacting until preferably at least 90% of the hydroxyl groups in the monomer mixture M are consumed by reaction with the isocyanate component C2, wherein the stoichiometry is chosen such that the remaining mass fraction of isocyanate groups in the reaction mixture, w(—NCO)=m(—NCO)/m(reaction mixture) is between 0.5% and 3%, preferably between 0.7% and 2.5%, after completion of the reaction, and e(12)—adding to the product of step (d12) a chain stopper F which has a primary or secondary amino group, and at least one further functional group which is an amino group of different reactivity than the first-named, or a hydroxyl group, preferably within a period of up to five minutes, homogenising, then adding a base N1 if an acid B11 was used in an amount of substance sufficient to neutralise at least 50% of the acid B11 used, and then adding water to form a dispersion, whereto an aqueous solution of a water-soluble radical initiator is added, and the aqueous dispersion is polymerised to form an acrylic-modified polyurethane dispersion, wherein the amounts of the reactants A1, B11, B2, C1, C2, E1, F, N1, M1 and M2 are chosen such that the resultant polyurethane U1 has a mass-average molar mass $M_{w1}$ of at least 10.0 kg/mol.

The invention is also directed to a process for the preparation of the aqueous of dispersion of polyurethane U2 of the invention comprising the steps of (a2)—providing a hydroxy-functional polycarbonate A2 as defined hereinabove, (b2)—mixing the polycarbonate A2 with a polyhydric alcohol E3 having at least three hydroxyl groups per molecule and a molar mass of less than 400 g/mol, and an organic acid B21 which is selected from the group consisting of hydroxy-functional organic acids and amino-functional organic acids, wherein the acid B21 has at least one, and preferably two, hydroxyl or primary or secondary amino groups and at least one acid group, (c2)—reacting the mixture prepared in step (b2) with at least one multifunctional isocyanate C3 having at least two isocyanate groups per molecule, wherein the amount of multifunctional isocyanate C3 is chosen such that there is a ratio of isocyanate groups in C3 to hydroxyl groups present in the mixture prepared in step (b) of from 2:1 to 1.1:1, until at least 90% of the hydroxyl groups of the mixture prepared in step (b1) are consumed by reaction with the multifunctional isocyanate C3, (d2)—adding to the reaction mixture of step (c2), after optionally cooling to a temperature between 60° C. and 110° C., least one hydroxyamine D having at least one primary or secondary amino group, and at least one hydroxyl group, and a base N2 in an amount of substance sufficient to neutralise at least 50% of the acid B21 used, and reacting until no more free isocyanate groups are detected, and (e2)—dispersing the reaction product of step (d2) in water, wherein the amounts of the reactants A2, B21, C3, D, N2, and E3 are chosen such that the resultant polyurethane U2 has a mass-average molar mass $M_{w2}$ of less than 10 kg/mol.

In a preferred embodiment, the process to make the polyurethane U1 comprises using an organic hydroxy-functional acid B11 in step (b1). In this case, the reaction product of step (c11) or (c12) is neutralised in step (d11) or (d12), before or during or after dispersing in water, by adding a base N1 which is an alkaline reagent selected from alkali hydroxides, earth alkali hydroxides, organic amines, ammonium hydroxide and alkylated ammonium hydroxide. Likewise, the process to make the polyurethane U2 comprises using an organic hydroxy-functional acid B21 in step (b2). The reaction product of step (c2) is neutralised in step (d2), before or during or after dispersing in water, by adding a base N2 which is an alkaline reagent selected from alkali hydroxides, earth alkali hydroxides, organic amines, ammonium hydroxide and alkylated ammonium hydroxide. Preferred as bases N1 and N2 are tertiary alkylamines, in both cases.

In a further preferred embodiment, in step (d2), the hydroxyamine component D comprises a mixture of a primary amine D1 having a hydroxyl group, and a secondary amine D2 having at least one, and preferably two, hydroxyl groups. Preferred as D1 are linear and branched aliphatic hydroxyamines having from two to six carbon atoms, such as ethanolamine (2-aminoethanol), isopropanolamine (1-amino-2-propanol), alaninol (2-amino-1-propanol), 3-amino-1-propanol, 2-amino-1-butanol, 4-amino-1-butanol, and 6-amino-1-hexanol. Preferred as D2 are linear and branched aliphatic hydroxyamines having from four to twelve carbon atoms, such as diethanolamine (2,2'-iminodiethanol), and diisopropanolamine (1,1'-iminodi-2-propanol). It has been found that such mixture improves, unexpectedly, the hydrolysis resistance of coating compositions based on polyurethanes U2 where such a mixture is used in step (d2) of its synthesis. Preferably, the mass fraction w(D1) of hydroxyamines D1 in the mixture D of D1 and D2 is 0.2 kg/kg≤w(D1)≤0.5 kg/kg, where w(D1) is the ratio of the mass m(D1) of hydroxyamines D1 to the sum m(D1)+m(D2) of the masses of hydroxyamines D1 and D2.

The invention also relates to a method of use of the said aqueous polyurethane dispersion U for the preparation of coating compositions, comprising the steps of admixing to the aqueous dispersible polyurethane U at least one additive selected from the group of wetting agents, defoamers, flow modifiers, antisettling agents, leveling agents, biocides, and coalescing agents, optionally pigments and colorants, to form a binder mixture, combining the binder mixture thus prepared with at least one crosslinking agent selected from the group consisting of capped and uncapped isocyanates, aminoplast crosslinkers, alkoxycarbonyl-amino triazines, and phenoplast resins, and applying the mixture of binder and crosslinking agent to a substrate by spraying, dipping, brushing, blade coating, curtain coating or roller coating, and drying the coated substrate optionally at elevated temperature to form a coating film on the said substrate. For the preparation of aqueous two-pack coating composition according to the invention, at least one aqueous dispersion of a polyurethane U1 having a mass-average molar mass $M_{w1}$ of at least 10 kg/mol, and at least one aqueous dispersion of a polyurethane U2 having a mass-average molar mass $M_{w2}$ of less than 10 kg/mol are mixed, either separately, or together with at least one of additives and modifiers, and a crosslinker X which is a multifunctional isocyanate crosslinker which may also be hydrophilically modified.

Polycarbonate polyols are particularly preferred as sole starting polyol materials (educts) A1 and A2 in the context of the present invention, over polyether polyols or polyester polyols. The polycarbonate polyols preferred in this invention are polycarbonates of linear or branched or cyclic aliphatic diols having from two to fourteen, preferably from four to twelve, carbon atoms, such as ethylene glycol, 1,2-dihydroxypropane, 1,3-dihydroxypropane, 1,4-dihydroxybutane, 2,2-dimethyl-1,3-dihydroxypropane, 1,5-dihydroxypentane, 1,6-dihydroxyhexane, 1,2-dihydroxycyclohexane, 1,4-dihydroxycyclohexane, 1,8-dihydroxy-octane, 2,2,4-trimethyl-1,3-dihydroxypentane, and 1,10-dihydroxydecane. Even small amounts of other polyols, such as polyesterpolyols, used in addition to polycarbonate polyols in the preparation of the polyurethanes, U1 and U2, lead to reduced adhesion properties as is shown in the examples. Therefore, the mass fraction w(A') of other polyols A' used together with polycarbonate polyols A1 or polycarbonate polyols A2 should be $$w(A')_1=m(A')/[m(A')+m(A1)]\leq 2\%, \text{ and } w(A')_2=m(A')/[m(A')+m(A2)]\leq 2\%,$$

where m(A') is the mass of polyols A', m(A1) is the mass of polyols A1, and m(A2) is the mass of polyols A2.

The mass fraction of moieties derived from the polyol component in the polyurethane resin (mass of A1 or A2 used in the synthesis divided by mass of the polyurethane resin) is usually between 15% and 80%, preferably between 30% and 60%.

The hydroxy-functional or amino-functional acids B1 (this definition applies independently to B11 and B21) which have at least one, and preferably two, hydroxyl or amino groups and at least one acid group, are described, for example, in U.S. Pat. Nos. 3,412,054 and 3,640,924 and in the DE patent 26 24 442 B2 and the DE patent application 27 44 544 A1, to which reference is made here. Hydroxy-functional acids B1 which are particularly suitable in this respect are those having at least one carboxyl group and in general from 1 to 3 carboxyl groups per molecule. Suitable groups capable of anion formation also include sulphonic acid groups. Examples of such compounds are dihydroxycarboxylic acids, such as α,α-dialkylolalkanoic acids, in particular α,α-dimethylolalkanoic acids, such as 2,2-dimethylolacetic acid, 2,2-dimethylolpropionic acid, 2,2-dimethylolbutyric acid, 2,2-dimethylolpentanoic acid, tartaric acids, and also polyhydroxy acids, such as gluconic acid. Particularly preferred among these are 2,2-dimethylolpropionic and 2,2-dimethylolbutyric acids. Examples of compounds B1 containing amino groups are α,δ-diaminovaleric acid, and 2,4-diaminotoluene-5-sulphonic acid. It is also possible to employ mixtures of these compounds B1. The mass fraction of component B1 in the polyurethane resin (mass of B1 used in the synthesis divided by mass of the resin) is in general from 2% to 20%, preferably from 4% to 10%.

The polyethers B2 have oligo-oxyethylene groups obeying the formula II

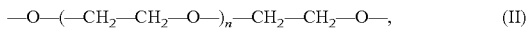

$$-O-(-CH_2-CH_2-O-)_n-CH_2-CH_2-O-, \qquad (II)$$

wherein n is from 1 to 100, and at least one, preferably two hydroxyl groups, comprise lateral or terminal oxyethylene groups of the formula II supra, and are incorporated into the polyurethane resin by reaction of an at least monovalent alcohol or an at least monovalent amine comprising the structure of the formula II supra with an isocyanate group present in the reaction mixture. Preferably, the mass fraction of compounds B2 if these are used in the synthesis is chosen such that the mass fraction of groups of formula II in the polyurethane resin is at least 1%, preferably at least 3%. The mass fraction of these groups of formula II should however not exceed 10%, and preferably, not 7%, as the water and humidity resistance would then be adversely affected. The lower range of mass fractions of components B1 and B2 is preferably used if both are present.

The polyfunctional isocyanates C having at least two isocyanate groups per molecule are selected from the group consisting of diisocyanates, isocyanates having three or more isocyanate groups, and also, isocyanurates, biurets, allophanates, and uretdiones derived from any of these di- or polyfunctional isocyanates. The diisocyanates which are suitable are compounds which are known in the polyurethane and paints sector, such as aliphatic, cycloaliphatic or aromatic diisocyanates. These are preferably of the formula $Q(NCO)_2$, where Q is a divalent hydrocarbon radical having from 4 to 40 carbon atoms, in particular from 4 to 20 carbon atoms and is preferably an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms, or an araliphatic hydrocarbon radical having from 7 to 15 carbon atoms. Examples of such diisocyanates which are to be employed with preference are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 2,2-(4,4'-diisocyanato) dicyclohexylpropane, 1,4-diisocyanatobenzene, 2,4- or 2,6-diisocyanatotoluene or mixtures of these isomers, 4,4'- or 2,4'-diisocyanatodiphenylmethane, 2,2-(4,4'-diisocyanato) diphenylpropane, p-xylylene diisocyanate and α,α,α',α'-tetramethyl-m- or -p-xylylene diisocyanate, and mixtures comprising these compounds.

C1, C2, and C3 are independently from each other, any of the multifunctional isocyanates C as defined hereinabove. They can all be the same, or can all be different from each other.

The polyhydric alcohols E are aliphatic linear, branched or cyclic alcohols having at least two, and up to forty carbon atoms, having at least two hydroxyl groups per molecule, and a molar mass of less than 400 g/mol. They are preferably selected from dihydric linear or branched aliphatic alcohols E1 having from two to forty carbon atoms, such as ethylene glycol, 1,2- and 1,3-propane diol, 1,2- and 1,4-butane diol, and dimer fatty alcohols. The introduction of tri- or polyhydric alcohols E3 is a convenient means of increasing the hydroxyl number of the polyurethane resin and leading to chain branching. These are preferably glycerol, trimethylolethane, trimethylol propane, pentaerythritol, diglycerol, ditrimethylol propane, and dipentaerythritol.

The chain stopper F has one primary or secondary amino group, and at least one further reactive group selected from the group consisting of an amino group having a reactivity different from the first-named amino group, and a hydroxyl group. Where F has at least two amino groups having different reactivity, particularly useful compounds include amines such as the primary/secondary amines 3-amino-1-methylaminopropane, 3-amino-1-ethylaminopropane, 3-amino-1-cyclo-hexylaminopropane and 3-amino-1-methylaminobutane. Where F has a primary or secondary amino group and a further reactive group which is a hydroxyl group, it is independently selected from the same group as D.

The components G1, so-called chain extenders include compounds which are reactive with isocyanate groups and are preferably at least difunctional with regard to isocyanate functional reactants. Examples of these are water, hydrazine and organic derivatives G1b thereof, preferably aliphatic dihydrazines and dihydrazides such as adipic acid dihydrazide, aliphatic diamines G1a having two primary amino groups such as ethylenediamine, diethylene triamine, triethylene tetramine, tetraethylene pentamine, 1,2- and 1,3-diaminopropane, isophorone diamine, 2- and 3-methylpentane diamine, and hexamethylene diamine, which may also carry further substituents such as hydroxyl groups. Such polyamines are described in the German patent application DE 36 44 371 A1. The mass fraction of moieties derived from this component G1 in the polyurethane U1 is usually between 1% and 10%, preferably between 2% and 5%.

In the preparation of the prepolymer in step (c11), the reaction is normally carried out at temperatures of from 60° C. to 140° C., preferably from 100° C. to 130° C., depending on the reactivity of the isocyanate employed, and as a rule in the absence of a catalyst but optionally in the presence of solvents which are inert toward isocyanates. In the case of using solvents, the temperatures mentioned supra may be chosen lower, depending on the reactivity of the isocyanate selected. Suitable solvents in this respect are in particular those which are compatible with water, such as ethers, ketones and esters, and also N-methylpyrrolidone or N-ethylpyrrolidone. The amount of this solvent should expediently not exceed a mass fraction of 20% in the solution of the resin or its educts or starting materials, and is preferably in the range from 5% to 15%. It is expedient to add the polyisocyanate to the solution of the remaining components.

As bases N1 or N2 for neutralisation of compounds B1 (viz., B11 or B21), tertiary amines are particularly suitable, for example trialkylamines having from 1 to 12, preferably from 1 to 6 carbon atoms in each alkyl radical. Examples of these compounds are trimethylamine, triethylamine, methyldiethylamine, 2-(N,N-dimethylamino)-2-methyl-propanol-1, and tripropylamine. The alkyl radicals can also contain, for example, hydroxyl groups, as in the case of the dialkylmonoalkanolamines, alkyldialkanolamines and trialkanolamines. An example of such a compound is dimethylethanolamine, which is also used preferably as the neutralising agent.

Other bases N1 or N2 which can be employed also include inorganic bases such as ammonia, or sodium or potassium hydroxide.

The base N1 or N2 is usually employed in a molar ratio with regard to the acid groups of the prepolymer of about 0.3 mol:1 mol to 1.3 mol:1 mol, preferably from about 0.5 mol:1 mol to 1 mol:1 mol.

Neutralisation which is usually carried out at between room temperature and 110° C. can be performed in any desired manner, for example by adding the water-containing neutralising agent to the polyurethane resin or vice versa. However, it is also possible first to add the neutralising agents to the polyurethane resin and only then to add the water. In general this results in a mass fraction of solids of from 20% to 70%, preferably from 30% to 50%.

The mass fraction of polyurethanes U1 and U2, calculated as the ratio of the sum m(U1)+m(U2) of masses m(U1) and m(U2) of polyurethanes U1 and U2, and the mass m(s) of all solids in the final aqueous coating composition additionally comprising additives, pigments, fillers, extenders, crosslinkers, etc. is in general from 5% to 40%, preferably from 15% to 30%.

Coating compositions are prepared from the polyurethane dispersion U by admixing to the aqueous polyurethane dispersion U at least one additive selected from the group of wetting agents, defoamers, flow modifiers, antisettling agents, levelling agents, biocides, and coalescing agents, optionally pigments and colorants, to form a binder mixture, combining the binder mixture thus prepared with at least one crosslinking agent selected from the group consisting of capped and uncapped isocyanates, hydrophilically capped and uncapped isocyanates, aminoplast crosslinkers, alkoxycarbonylamino triazines, and phenoplast resins, and applying the mixture of binder and crosslinking agent to a substrate by spraying, dipping, brushing, blade coating, curtain coating or roller coating, and drying the coated substrate optionally at elevated temperature to form a coating film on the said substrate. Coating compositions comprising the aqueous polyurethane dispersion U are particularly suited to paint substrates made from thermoplastic materials, especially those based on polycarbonates or copolycarbonates or polyestercarbonates, and their blends with styrene polymers, styrene copolymers and styrene terpolymers, and impact-resistant grades of these, especially acrylonitrile-butadiene-styrene terpolymers.

The invention is further illustrated in the following examples which are not to be construed as limiting.

The following parameters are used in the context of the present invention:

The acid number is defined, according to DIN EN ISO 3682 (DIN 53 402), as the ratio of that mass $m_{KOH}$ of potassium hydroxide which is needed to neutralise the sample under examination, and the mass ms of this sample, or the mass of the solids in the sample in the case of a solution or dispersion; its customary unit is "mg/g".

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

Molar mass of the polyurethane (mass average $M_w$) was determined via size exclusion chromatography on solutions of the polyurethane in tetrahydrofurane as a solvent, using polystyrene standards.

Concentrations are generally (unless otherwise stated) mass fractions, i. e. the ratio of the mass $m_B$ of the constituent B in question to the mass m of the sample which may be a mixture or solution, and are usually stated in %, or cg/g. Isocyanate concentration, therefore, is mass of isocyanate groups (—N═C═O, molar mass 42.02 g/mol) present in a sample, divided by the mass of that sample, and is measured in accordance with DIN EN ISO 11 909.

Dynamic viscosity of the dispersions was measured using a cone and plate viscometer, at 23° C., and a shear rate of 100 s$^{-1}$ unless otherwise indicated.

Specific amount b(X) of substance of a constituent or functional group (amount of substance n(X) of a constituent or functional group in a sample, divided by the mass m of the sample), here for urea groups >N—CO—N<, and hydroxyl groups —OH, is referred to as "content" for simplicity, and usually measured in mmol/g or the ratio of SI basic units, mol/kg, showing the same numerical value. When these contents are measured on an aqueous dispersion, the mass of the sample used in these calculations is always the mass of solids in the dispersion.

Likewise, the degree of branching DB in a polyurethane with a mass m, is stated as the sum of the specific amounts of substance $n(E_j)/m$ of moieties in this polyurethane derived from hydroxy-functional compounds $E_j$ each having j hydroxyl groups where j is more than two, multiplied by j–2, where j is, for each such moiety, the number of hydroxyl groups in the compounds $E_j$, calculated as: $DB=\Sigma_{j=3}^{\infty}[n(E_j)\times(j-2)]/m$. Degree of branching, hereinafter also referred to as "branching", was calculated from the amounts of educts (starting materials). Hydroxyl group content and urea content were also calculated from the amounts of educts.

With special preference for U2, the range for the degree of branching DB as defined hereinabove is from 0.2 mol/kg to 0.33 mol/kg, and the range for the specific amount of urea groups of formula I, >N—CO—N<, is from 1.0 mol/kg to 1.8 mol/kg, and the range for the specific amount of substance of hydroxyl groups, —OH, is from 1.4 mol/kg to 3.5 mol/kg.

For all such parameters which relate to the ratio b(X) of the amount of substance n(X) for a particular chemical group X, viz. degree of branching, urea groups, or hydroxyl groups, to the mass of the resin, m(Resin), defined by b(X)=n(X)/m(Resin), also referred to as the specific amount of substance, in accordance with DIN 32 625, m(Resin) is the mass of the polyurethane under consideration.

Example 1 Preparation of Low Molar Mass Polyurethane Dispersions PL

Two different polyurethane dispersions PL1 and PL2 were synthesised.

1.1 For polyurethane dispersion PL1, a mixture of 1020 g of a hydroxyfunctional polycarbonate based on 1,6-hexanediol (hydroxyl number: 110 mg/g; molar mass approximately 1 kg/mol, commercially available as Desmophen® XP 2586 from Covestro AG), 218.4 g of α,α-dimethylolpropionic acid, and 134 g of trimethylolpropane was heated to 60° C. with stirring. 1763.5 g of m-tetramethylxylylene diisocyanate were added. The resulting mixture was stirred and heated to 120° C. At that temperature, the reaction was continued until the mass fraction of isocyanate in the reaction mixture was less than 8.3%. The mixture was then cooled to 90° C., and a mixture of 309.5 g of diethanolamine and 179.8 g of ethanolamine was added. 145.2 g of N,N-dimethylethanolamine were then added. The resulting mixture was stirred for thirty minutes. Immediately thereafter, the reaction mass was dispersed in 5292.7 g of distilled water at 80° C. and stirred for one hour. The following parameters were determined for this dispersion:

| | |
|---|---|
| urea content: | 1.643 mmol/g |
| OH content: | 2.464 mmol/g |
| branching: | 0.265 mmol/g |
| mass fraction of solids: | 39.7% |
| acid number: | 26.3 mg/g |
| pH value: | 7.9 |
| molar mass $M_w$ of the polyurethane: | 6450 g/mol |

1.2 For polyurethane dispersion PL2, the synthesis was the same as for PL1 except that 2.5% of the mass of the hydroxy-functional polycarbonate in the first reaction step were substituted with the same mass of a polyester made from adipic acid and hexanediol with a hydroxyl number of 110 mg/g. The mass fraction of the polymer in the dispersion was about 40%. The mass average molar mass $M_m$ of the polyurethane in the dispersion was 6600 g/mol. All other characteristics of this polymer were the same as above.

Example 2 Preparation of High Molar Mass Polyurethane Dispersions PH

Two high molar mass polyurethane dispersions PH1 and PH2 were synthesised.

2.1 For polyurethane dispersion PH1, 805 g of a hydroxy-functional polycarbonate based on 1,6-hexanediol (hydroxyl number: 110 mg/g; commercially available as Desmophen® XP 2586 from Covestro AG), 41.9 g of α,α-dimethylolpropionic acid, and 37.25 g of 1,4-butanediol were mixed together and heated until a temperature of 130° C. was reached. After getting a homogenous mixture, 184.5 g of m-tetramethylxylylene diisocyanate were added over thirty to forty minutes. The reaction mixture was stirred at 130° C. until the NCO concentration was zero. After consumption of all NCO groups, the product was cooled to 70° C., followed by the addition of 260.2 g of methylmethacrylate, dibutyl tin oxide as catalyst in a mass fraction of 0.05% based on the mass of reactants, 2 g of 2,6-di-tert.-butyl-4-methylphenol and 35.6 g of glycerol monomethacrylate. This mixture was homogenised for fifteen minutes, and 306 g of m-tetramethylxylylene diisocyanate were added within five minutes. Temperature was then increased slowly to reach a reaction temperature of 80° C. At this temperature, the reaction was continued until the theoretical mass fraction of NCO groups of 1.4% was reached.

To this reaction product, 57 g of diethanolamine were added fast, and the mixture was homogenised for thirty minutes. After addition of 17.5 g of dimethylethanolamine, the stirrer speed was increased and 2850 g of distilled water having a temperature of 70° C. were added. A solution of 3.3 g of ammonium persulfate and 330 g of distilled water was prepared. A 10% part of this solution was added at 80° C., the residual amount of approximately 300 g was added within forty-five minutes, and the mixture thus produced was stirred at 80° C. for two further hours. The resulting dispersion comprised a mass fraction of solids of 35%, the pH was 8.0, and the dynamic viscosity was 34 mPa·s. The mass average molar mass $M_w$ of the polyurethane in the dispersion PH1 was 28 kg/mol, the specific content of urea groups was n(>N—CO—N<)/m=0.31 mol/kg, the specific content of hydroxyl groups was n(OH)/m=0.63 mol/kg, and the degree of branching was zero.

2.2 For PH2, 245.4 g of a hydroxy-functional polycarbonate based on 1,6-hexandiol (hydroxyl number: 110 mg/g; commercially available as Desmophen® XP2586 from Covestro AG), 18.3 g of α,α-dimethylolpropionic acid, 100 g of N-ethyl-2-pyrrolidone, 2.93 g of 1,6-hexanediol, and 0.04 g of dibutyltin oxide were charged, heated to 65° C., and stirred for one hour so that the mixture was a clear solution. 96.7 g of isophorone diisocyanate were added to this solution. The temperature of this reaction mixture was increased to 100° C. The mixture was stirred at this temperature until the theoretical mass fraction of NCO groups of 0.65% was reached. The mixture was then cooled to 95° C. 10.8 g of triethylamine were added, and the resulting mixture was homogenised for twenty-five minutes. This solution was dispersed in 435 g of deionised water having a temperature of 80° C. over the course of less than ten minutes, and immediately thereafter, a solution of 1.87 g ethylenediamine in 50 g of deionised water was added. Following a homogenisation phase of one hour, the batch was cooled to room temperature (23° C.). A fine dispersion was obtained having a mass fraction of nonvolatile matter of 37.8%, a dynamic viscosity of approximately 1250 mPa·s (measured at a shear rate of 25 $s^{-1}$) and a pH of 8.1. The mass average molar mass $M_w$ of the polyurethane in the dispersion PH2 was above the detection limit of 1500 kg/mol, the specific content of urea groups was n(>N—CO—N<)/m=0.17 mol/kg, the specific content of hydroxyl groups and the degree of branching were zero.

Example 3 Preparation of Polymer Formulations with Low and High Molar Mass Polyurethane Polymers and Test for Solvent Resistance Formulations 1 to 6 with low molar mass PL1 or PL2, high molar mass PH1 or PH2 and hydrophobic or hydrophilic multifunctional isocyanate crosslinkers were prepared as binders for coating applications. Hexamethylene diisocyanate (HDI) trimer and a hydrophilically modified HDI derivative were used as crosslinkers. In Table 1, the amount of HDI is expressed the ratio of the amount of substance n(NCO) of isocyanate groups in the isocyanate crosslinker to the amount of substance n(OH) of hydroxyl groups in the aqueously dispersed polyurethanes.

The composition of formulations 1 to 6 is given in Table 1 below.

TABLE 1

Composition of formulations 1 to 6 (mass m, amount of substance n)

| ingredient | | 1 | 2 | 3 | 4 | 5 | 6 |
|---|---|---|---|---|---|---|---|
| PL1 | m/g | 180.0 | 180.0 | 180.0 | 180.0 | | |
| PL2 | m/g | | | | | 180.0 | 180.0 |
| PH1 | m/g | 86.0 | 86.0 | | | | |
| PH2 | m/g | | | 86.0 | 86.0 | 86.0 | 86.0 |
| wetting agent | m/g | 1.0 | 1.0 | 1.0 | 1.0 | 1.0 | 1.0 |
| defoamer | m/g | 0.5 | 0.5 | 0.5 | 0.5 | 0.5 | 0.5 |
| deionised water | m/g | 20.0 | 20.0 | 20.0 | 20.0 | 20.0 | 20.0 |
| HDI trimer, | m/g; | 65; 1.4 | | 65; 1.4 | | 65; 1.4 | |

TABLE 1-continued

Composition of formulations 1 to 6 (mass m, amount of substance n)

| ingredient | | 1 | 2 | 3 | 4 | 5 | 6 |
|---|---|---|---|---|---|---|---|
| hydrophobic | n(NCO)/n(OH) in mol/mol | | | | | | |
| HDI oligomer, hydrophilic | m/g; n(NCO)/n(OH) in mol/mol | | 70; 1.4 | | 70; 1.4 | | 70; 1.4 |

3.1 Preparation of formulation 1 was as follows: 180 g of PL1 of example 1.1 were mixed with 86 g of PH1 of example 2.1, 1.0 g of a polyether modified polysiloxane wetting agent (Additol® VXW 6503N, Allnex Austria), 0.5 g of a non-ionic defoamer (Surfynol® 104E; mixture of equal masses of 2,4,7,9-tetramethyl-5-decin-4,7-diol, and ethylene glycol; Air Products), and 20 g of deionised water to adjust the viscosity. 65 g of a hydrophobic trimeric polyisocyanate based on hexamethylene diisocyanate (Desmodur® N3390, Covestro AG) were then added, and the mixture was stirred for ten minutes to obtain a clear coating composition. A 200 µm wet film was applied on a glass plate with a step gap film applicator and was allowed to flash off for ten minutes. The coating was cured for thirty minutes at 80° C. followed by a post-cure step for twelve hours at 70° C. in order to guarantee full curing.

Acetone resistance of the cured film was tested by applying a drop of acetone onto the coating film, and covering the test spot with a beaker. The coating film was tested every thirty seconds whether the film was already soft and sticky, and acetone was supplemented during the test period if necessary. In this test the coating showed no softening under the influence of acetone within 9.5 min whereafter the test was stopped. Performing the same test with xylene as solvent resulted in more than ten minutes of solvent resistance.

3.2 Preparation of formulation 2 was as follows: 180 g of PL1 of example 1.1 were mixed with 86 g of PH1 of example 2.1, 1.0 g of a polyether modified polysiloxane wetting agent (see supra), 0.5 g of a non-ionic defoamer (see supra), and approximately 20 g of deionised water to adjust the viscosity. 70 g of a hydrophilic oligomeric polyisocyanate based on hexa-methylene diisocyanate (Bayhydur® 304; Covestro AG) were then added, and the mixture was stirred for ten minutes. A 200 µm wet film was applied on a glass plate with a step gap film applicator and was allowed to flash off for ten minutes. The coating was cured for thirty minutes at 80° C. followed by a post-cure step for twelve hours at 70° C. in order to guarantee full curing.

Acetone resistance of the cured film was tested as described supra. In this test the coating showed no softening under the influence of acetone within 4.5 min whereafter the test was stopped. Performing the same test with xylene as solvent resulted in more than ten minutes of solvent resistance.

3.3 Preparation of formulation 3 was as follows: 180 g of PL1 of example 1.1 were mixed with 86 g of PH2 of example 2.2, 1.0 g of a polyether modified polysiloxane wetting agent (see supra), 0.5 g of a non-ionic defoamer (see supra), and 20 g of deionised water to adjust the viscosity. 65 g of a hydrophobic trimeric polyisocyanate based on hexamethylene diisocyanate (see supra) were added and the mixture was stirred for ten minutes.

A 200 µm wet film was applied on a glass plate with a step gap film applicator and was allowed to flash off for ten minutes. The coating was cured for thirty minutes at 80° C. followed by a post-cure step for twelve hours at 70° C. in order to guarantee full curing.

Acetone resistance of the cured film was tested as described supra. In this test the coating showed no softening under the influence of acetone within 3.5 min whereafter the test was stopped. Performing the same test with xylene as solvent resulted in more than ten minutes of solvent resistance.

3.4 Preparation of formulation 4 was as follows: 180 g of PL1 of example 1.1 were mixed with 86 g of PH2 of example 2.2, 1.0 g of a polyether modified polysiloxane wetting agent (see supra), 0.5 g of a non-ionic defoamer (see supra), and approximately 20 g of deionised water to adjust the viscosity. 70 g of a hydrophilic oligomeric polyisocyanate based on hexa-methylenediisocyanate (see supra) were added and the mixture was stirred for ten minutes. A 200 µm wet film was applied on a glass plate with a step gap film applicator and was allowed to flash off for ten minutes. The coating was then cured for thirty minutes at 80° C. followed by a post-cure step of twelve hours at 70° C. in order to guarantee full curing.

Acetone resistance of the cured film was tested as described supra. In this test the coating showed no softening under the influence of acetone within five minutes whereafter the test was stopped. Performing the same test with xylene as solvent resulted in more than ten minutes of solvent resistance.

3.5 Preparation of formulation 5 was as follows: 180 g of PL2 of example 1.2 were mixed with 86 g of PH2 of example 2.2, 1.0 g of a polyether modified polysiloxane wetting agent (see supra), 0.5 g of a non-ionic defoamer (see supra), and 20 g of deionised water to adjust the viscosity. 65 g of a hydrophobic, trimeric polyisocyanate based on hexamethylene diiso-cyanate (see supra) were then added and the mixture was stirred for ten minutes. A 200 µm wet film was applied on a glass plate with a step gap film applicator and was allowed to flash off for ten minutes. The coating was cured for thirty minutes at 80° C. followed by a post-cure step for twelve hours at 70° C. in order to guarantee full curing.

Acetone resistance of the cured film was tested as described supra. In this test the coating showed no softening under the influence of acetone within three minutes whereafter the test was stopped. Performing the same test with xylene as solvent resulted in more than ten minutes of solvent resistance.

3.6 Preparation of formulation 6: 180 g of PL2 of example 1.2 were mixed with 86 g of PH2 of example 2.2, 1.0 g of a polyether modified polysiloxane wetting agent (see supra), 0.5 g of a non-ionic defoamer (see supra), and 20 g of deionised water to adjust the viscosity. 70 g of a hydrophilic oligomeric polyisocyanate based on hexamethylene diiso-cyanate (see supra) were added, and the mixture was stirred for ten minutes. A 200 µm wet film was applied on a glass plate with a step gap film applicator and was allowed to flash off for ten minutes. The coating was then cured for thirty minutes at 80° C. followed by a post-cure step for twelve hours at 70° C. in order to guarantee full curing.

Acetone resistance of the cured film was tested as described supra. In this test the coating showed no softening under the influence of acetone within four minutes whereafter the test was stopped. Performing the same test with xylene as solvent resulted in more than ten minutes of solvent resistance.

Example 4 Hot Water Resistance 4.1 Clearcoats

Coating films based on mixtures of a dispersion PL1 with a dispersion PH1 showed improved hot water resistance on challenging plastic substrates such as ABS/PC blends (blends of an acrylonitrile-butadiene-styrene terpolymer with polycarbonate) compared to coating films obtained from standard polyurethane dispersions. Substrates used were an injection moulding grade of polycarbonate (bisphenol A-based polycarbonate, Tecanat®, Ensinger GmbH), an injection moulding grade of ABS (Magnum™ 3616, Trinseo Europe GmbH) and three injection moulding grades of ABS/PC blends (ABS/PC 1: Bayblend® T65, Vicat softening temperature $T_{Vic}$=119° C. measured according to ISO 306 at 50 K/h; ABS/PC 2: Bayblend® T65XF, $T_{Vic}$=118° C.; ABS/PC 3: Bayblend® T85, $T_{Vic}$=129° C.; all Covestro AG).

Formulations 1 to 6 were tested in hot water environment (72 hours, 95% relative humidity, 90° C.) and benchmarked against a comparative 2 pack polyurethane dispersion (Example 7 of WO 2011/051 359 A1) with the same kind and amount of additives and hydrophobic curing agent. Adhesion of the coating film was tested before and after hot water test according to DIN EN ISO 2409. The test results are summarised in Table 2. (0=full adhesion, 5=no adhesion):

TABLE 2

Adhesion results after hot water test

| | substrate | | | | |
|---|---|---|---|---|---|
| | ABS | PC | (ABS/PC)1 | (ABS/PC)2 | (ABS/PC)3 |
| formulation 1 | 1 | 4 | 1 | 4 | 2 |
| formulation 2 | 0 | 5 | 0 | 0 | 1 |
| formulation 3 | 0 | 0 | 0 | 4 | 4 |
| formulation 4 | 0 | 0 | 2 | 0 | 0 |
| formulation 5* | 0 | 5 | 5 | 5 | 5 |
| formulation 6* | 0 | 5 | 5 | 5 | 5 |
| comparative formulation | 0 | 5 | 0 | 5 | 5 |

Adhesion before hot water test was 0 (full adhesion) on all substrates tested. Values in Table 2 have been measured after the hot water test.
*in these formulations, the low molar mass polyurethane dispersion of example 1.2 was used where 2.5% of the hydroxy-functional polycarbonate was replaced with a hydroxy-functional polyester, i.e., outside of the allowed limit of mass fractions for polyols other than polycarbonate polyols of less than, or equal to, 2%.

4.2 Metallic Basecoat

In further experiments, the hot water resistance was tested with paints where metallic flakes were incorporated. Table 3 shows the compositions of formulations 7 and 8 prepared for this test.

TABLE 3

Composition of formulations 7 and 8 (mass m, amount of substance n)

| ingredient | | Formulation 7 | Formulation 8 |
|---|---|---|---|
| PL1 | m/g | 180.0 | |
| PH2 | m/g | 86.0 | 86.0 |
| comparative PUD* | m/g | | 180.0 |
| pigment wetting agent | m/g | 0.5 | 0.5 |
| metallic flake suspension | m/g | 54.0 | 54.0 |
| wetting agent | m/g | 1.0 | 1.0 |
| defoamer | m/g | 0.5 | 0.5 |
| deionised water | m/g | 20.0 | 20.0 |
| HDI trimer, hydrophobic | m/g; n(NCO)/n(OH) | 65; 1.4 mol/mol | 65; 1.4 mol/mol |

*comparative PUD as in example 4.1
pigment wetting agent: amine neutralised phosphoric acid ester (Additol ® XL 250, Allnex Austria)
metallic flake suspension: aluminium flakes dispersed in butylglycol (STAPA ® Hydrolan 2154, Eckart GmbH), mass fraction w(Al) = 60%
wetting agent: as in example 3
defoamer: as in example 3
HDI trimer: as in example 3

Method of preparation: the components listed in table 8 with exception of the curing agent were mixed in the order stated, and were let to rest for sixteen hours at room temperature (23° C.). Thereafter, the isocyanate curing agent was added, and the resulting composition was adjusted to spray viscosity between 300 mPa·s and 400 mPa·s, measured at a shear rate of 25 s$^{-1}$ and 23° C. The coating composition thus obtained was applied to the plastic material sheets as substrates with a spray gun (SATA RP 3000, SATA GmbH & Co. KG), to form a coating film with a dry thickness of between 15 μm and 30 μm, after curing at 80° C. for thirty minutes followed by a post-cure step at 70° C. for twelve hours.

Adhesion was tested before and after hot water test according to DIN EN ISO 2409. The test results are summarised in Table 4 (0=full adhesion, 5=no adhesion).

TABLE 4

Adhesion results after hot water test
Adhesion before hot water test was 0 on all substrates tested.
Values stated in table 9 have been measured after hot water test

| | substrate | | | | |
|---|---|---|---|---|---|
| | ABS | PC | (ABS/PC)1 | (ABS/PC)2 | (ABS/PC)3 |
| formulation 7 | 0 | 0 | 0 | 0 | 0 |
| formulation 8 | 0 | 5 | 5 | 5 | 5 |

Example 5 Hand Cream and Sun Lotion Resistance

Coatings based on formulations 1 to 6 as described above and a comparative coating based on the comparative PUD as in Example 4.1 were tested for chemical resistance against a test hand cream (test cream according to Volkswagen AG test PV 3964, Type A, available from Thierry GmbH, Stuttgart) and a test sun lotion (test lotion according to Volkswagen AG test PV 3964, Type B, available from Thierry GmbH, Stuttgart) on critical plastic substrates including PC, ABS, and ABS/PC blends. Tests were performed by impregnating a gauze strip having an area of 1 cm$^2$ with cream or lotion, removing the excess cream or lotion with a spatula, positioning this gauze strip onto a painted surface, covering substrate and strip with a plastic cap, and heating in an oven at 80° C. for twenty-four hours. Adhesion was tested on these samples by the cross hatch test with tape pull off according to DIN EN ISO 2409, "0"=best (no loss of adhesion), 5=worst (whole cross-hatched area is loose).

Formulations 1 to 4 showed best results in terms of adhesion even on critical substrates like ABS/PC blends. Formulations 5 and 6 where a part of the polycarbonate diol used for the synthesis of the polyurethane was replaced by a polyester diol resulted in loss of adhesion after these tests. Similar results have been obtained when a part (2.5% of its mass), or all, of the polycarbonate diol in the high molar mass PUD had been replaced by a polyesterdiol.

The results are shown in Table 5.

TABLE 5

Adhesion results after hand cream "HC"/sun lotion "SL" test

| substrate | | ABS | PC | (ABS/PC)1 | (ABS/PC)2 | (ABS/PC)3 |
|---|---|---|---|---|---|---|
| formula- | HC | 5 | 0 | 0 | 0 | 2 |
| tion 1 | SL | 5 | 0 | 0 | 0 | 0 |
| formula- | HC | 0 | 1 | 1 | 0 | 1 |
| tion 2 | SL | 0 | 1 | 0 | 0 | 1 |
| formula- | HC | 1 | 5 | 0 | 0 | 0 |
| tion 3 | SL | 1 | 5 | 0 | 0 | 1 |
| formula- | HC | 5 | 0 | 1 | 2 | 2 |
| tion 4 | SL | 5 | 0 | 1 | 2 | 2 |
| formula- | HC | 5 | 5 | 5 | 5 | 5 |
| tion 5 | SL | 0 | 5 | 5 | 5 | 5 |
| formula- | HC | 5 | 5 | 5 | 5 | 5 |
| tion 6 | SL | 0 | 5 | 5 | 5 | 5 |
| comparative | HC | 5 | 5 | 5 | 5 | 5 |
| formulation | SL | 0 | 5 | 5 | 5 | 5 |

The invention claimed is:

1. An aqueous polyurethane dispersion U comprising at least two aqueously dispersed polyurethanes whereof at least one is an aqueously dispersible polyurethane U1 having a mass-average molar mass $M_{w1}$ of at least 10 kg/mol, and at least one is an aqueously dispersible polyurethane U2 having a mass-average molar mass $M_{w2}$ of less than 10 kg/mol, a specific amount of substance of hydroxyl groups n(—OH)/m(U2) of from 1.4 mol/kg to 4 mol/kg, a degree of branching of up to 0.5 mol/kg, and a specific amount of substance of urea groups n(—NH—CO—NH—)/m(U2) of from 0.8 mol/kg to 2 mol/kg, wherein hydroxy-functional polycarbonates of formula III HO—(X—O—CO—O—)$_m$—X—OH    Formula III, are used in the synthesis of U1 and U2, where X is a linear, branched or cyclic alkylene group, and m is an integer number, and the number average molar mass $M_n$ of the hydroxy-functional polycarbonate of formula III is at least 400 g/mol, and the mass fraction w(A')$_1$ of polyols A' other than hydroxy-functional polycarbonates A1 in the polyols used in the synthesis of U1 and the mass fraction w(A')$_2$ of polyols A' other than hydroxy-functional polycarbonates A2 in the polyols used in the synthesis of U2 are

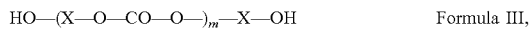
w(A')$_1$=m(A')/[m(A')+m(A1)]≤2%, and w(A')$_2$=m(A')/[m(A')+m(A2)]≤2%, where m(A') is the mass of polyols A', m(A1) is the mass of polyols A1, and m(A2) is the mass of polyols A2.

2. The aqueous polyurethane dispersion of claim 1 wherein the mass fraction w(U2)=m(U2)/[m(U1)+m(U2)] of the polyurethane U2 is between 0.50 kg/kg and 0.80 kg/kg, where m(U1) is the mass of polyurethane U1 in the dispersion U, and m(U2) is the mass of polyurethane U2 in dispersion U.

3. The aqueous polyurethane dispersion U of claim 1 in which at least one of the said aqueously dispersible polyurethanes U1 and U2 has a specific amount of substance of acid and/or acid anion groups of from 0.1 mol/kg to 1.8 mol/kg.

4. The aqueous polyurethane dispersion of claim 1 wherein in the hydroxy-functional polycarbonate A of formula III:

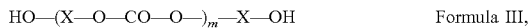
HO—(X—O—CO—O—)$_m$—X—OH    Formula III,

X is a linear, branched or cyclic alkylene group having from four to fourteen carbon atoms, and m is an integer number from four to thirty.

5. The aqueous polyurethane dispersion of claim 1 wherein the at least one aqueously dispersible polyurethane U2 having a mass-average molar mass $M_{w2}$ of less than 10 kg/mol, has a specific amount of substance of hydroxyl groups n(—OH)/m(U2) of the polyurethane polymer U2 of from 1.4 mol/kg to 3.5 mol/kg, a degree of branching of from 0.2 mol/kg to 0.33 mol/kg, and a specific amount of substance of urea groups n(—NH—CO—NH—)/m (U2) of from 1.0 mol/kg to 1.8 mol/kg.

6. A process for the preparation of the aqueous polyurethane dispersion U of claim 1 by mixing at least one aqueously dispersible polyurethane U1 having a mass-average molar mass $M_{w1}$ of at least 10 kg/mol, and at least one aqueously dispersible polyurethane U2 having a mass-average molar mass $M_{w2}$ of less than 10 kg/mol, wherein the aqueously dispersed polyurethane U1 is made in a process comprising the steps of (a1)—providing a hydroxy-functional polycarbonate A1 of formula III

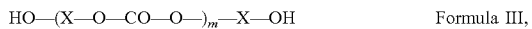
HO—(X—O—CO—O—)$_m$—X—OH    Formula III, where X is a linear, branched or cyclic alkylene group, and m is an integer number, (b1)—mixing the polycarbonate A1 with a polyhydric alcohol E1 having at least two hydroxyl groups per molecule, and a molar mass of less than 400 g/mol, and either or both of an organic acid B11 which is selected from the group consisting of hydroxy-functional organic acids and amino-functional organic acids, and a hydrophilic polyether B2, wherein the acid B11 has at least one hydroxyl or primary or secondary amino group and at least one acid group, and wherein the hydrophilic polyether B2 has moieties derived from oxyethylene groups obeying the formula II

—O—(—CH$_2$—CH$_2$—O—)$_n$—CH$_2$—CH$_2$—O—,    (II)

wherein n is from 1 to 100, and at least one, preferably two hydroxyl groups, (c11)—reacting the mixture prepared in step (b1) at an elevated temperature with at least one multifunctional isocyanate C1 having at least two isocyanate groups per molecule, wherein the amount of multifunctional isocyanate C1 is chosen such that there is a ratio of isocyanate groups in C1 to hydroxyl groups present in the mixture prepared in step (b1) of from 2:1 to 1.1:1

(d11)—adding to the optionally cooled reaction product of step (c11) a base N1 if an acid B11 was used in step (b1), in an amount of substance sufficient to neutralise at least 50% of the acid groups of the acid B11 used, dispersing the resultant mixture in water, adding immediately thereafter, a chain extender G1 selected from the group consisting of aliphatic diamines G1a and aliphatic dihydrazides G1b, reacting this mixture until consumption of the remaining reactive isocyanate groups, and reactive groups of the chain extender G1, and homogenising under cooling to room temperature (23° C.), wherein the amounts of the reactants A1, B11, B2, C1, G1a, G1b, and N1 are chosen such that the resultant polyurethane U1 has a mass-average molar mass $M_{w1}$ of at least 10.0 kg/mol.

7. The process of claim 6 wherein a hydroxy-functional acid B11 is used in step (b1), and wherein in step (e11), the reaction product of step (d11) is neutralised before or during or after dispersing in water by adding a base N1 selected from alkali hydroxides, earth alkali hydroxides, amines, ammonium hydroxide and alkylated ammonium hydroxide.

8. The process of claim 6 wherein step (c11) is conducted until at least 90% of the hydroxyl groups of the mixture prepared in step (b1) are consumed by reaction with the multifunctional isocyanate C1.

9. A process for the preparation of the aqueous polyurethane dispersion U of claim 1 by mixing at least one aqueously dispersible polyurethane U1 having a mass-average molar mass $M_{w1}$ of at least 10 kg/mol, and at least one aqueously dispersible polyurethane U2 having a mass-average molar mass $M_{w2}$ of less than 10 kg/mol, wherein the aqueously dispersed polyurethane U1 is made in a process comprising the steps of (a1)—providing a hydroxy-functional polycarbonate A1 of formula III

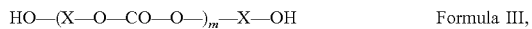

$$HO-(X-O-CO-O-)_m-X-OH \quad \text{Formula III,}$$

where X is a linear, branched or cyclic alkylene group, and m is an integer number, (b1)—mixing the polycarbonate A1 with a polyhydric alcohol E1 having at least two hydroxyl groups per molecule, and a molar mass of less than 400 g/mol, and either or both of an organic acid B11 which is selected from the group consisting of hydroxy-functional organic acids and amino-functional organic acids, and a hydrophilic polyether B2, wherein the acid B11 has at least one hydroxyl or primary or secondary amino group and at least one acid group, and wherein the hydrophilic polyether B2 has moieties derived from oxyethylene groups obeying the formula II $$-O-(-CH_2-CH_2-O-)_n-CH_2-CH_2-O-, \quad (II)$$

wherein n is from 1 to 100, and at least one hydroxyl group, (c12)—reacting the mixture prepared in step (b1) at an elevated temperature with at least one multifunctional isocyanate C1 having at least two isocyanate groups per molecule, wherein the amount of multifunctional isocyanate C1 is chosen such that there is a ratio of isocyanate groups in C1 to hydroxyl groups present in the mixture prepared in step (b1) of from 1.7:1 to 1.1:1, (d12)—adding to the optionally cooled reaction product of step (c12) a mixture of olefinically unsaturated monomers M which mixture M comprises at least one olefinically unsaturated monomer M1 which is an ester of an olefinically unsaturated carboxylic acid M11 having from three to six carbon atoms and at least one carboxylic acid group, and a linear or branched aliphatic alcohol M12 having from one to fifteen carbon atoms, and at least one hydroxyfunctional olefinically unsaturated monomer M2 which is an ester of one mole of an olefinically unsaturated carboxylic acid M21 having from three to six carbon atoms and at least one carboxylic acid group, and one mole of a linear or branched aliphatic alcohol M22 having from one to fifteen carbon atoms, and at least two hydroxyl groups, homogenising the mixture thus obtained, and adding thereto a further quantity of an isocyanate component C2, which may be different from, or may be the same as, C1, wherein the stoichiometry is chosen such that the remaining mass fraction of isocyanate groups in the reaction mixture, w(—NCO)=m(—NCO)/m(reaction mixture), is between 0.5% and 3% after completion of the reaction, and e(12)—adding to the product of step (d12) a chain stopper F which has a primary or secondary amino group, and at least one further functional group which is an amino group of different reactivity than the first-named, or a hydroxyl group, homogenising, then adding a base N1 if an acid B11 was used in an amount of substance sufficient to neutralise at least 50% of the acid B11 used, and then adding water to form a dispersion, whereto an aqueous solution of a water-soluble radical initiator is added, and the aqueous dispersion is polymerised to form an acrylic-modified polyurethane dispersion, wherein the amounts of the reactants A1, B11, B2, C1, C2, E1, F, N1, M1 and M2 are chosen such that the resultant polyurethane U1 has a mass-average molar mass $M_{w1}$ of at least 10.0 kg/mol.

10. The process of claim 9, wherein a hydroxy-functional acid B11 is used in step (b1), and wherein in step (e12), the reaction product of step (d12) is neutralised before or during or after dispersing in water by adding a base N1 selected from alkali hydroxides, earth alkali hydroxides, amines, ammonium hydroxide and alkylated ammonium hydroxide.

11. The process of claim 9 wherein step (c12) is conducted until at least 90% of the hydroxyl groups of the mixture prepared in step (b1) are consumed by reaction with the multifunctional isocyanate C1.

12. The process of claim 9 wherein the mixture M of olefinically unsaturated monomers mixture M comprises at least one olefinically unsaturated monomer M1 which is an ester of an olefinically unsaturated carboxylic acid M11 having from three to six carbon atoms and at least one carboxylic acid group, and a linear or branched aliphatic alcohol M12 having from one to fifteen carbon atoms, and at least one hydroxyfunctional olefinically unsaturated monomer M2 which is an ester of one mole of an olefinically unsaturated carboxylic acid M21 having from three to six carbon atoms and at least one carboxylic acid group, and one mole of a linear or branched aliphatic alcohol M22 having from one to fifteen carbon atoms, and three or more hydroxyl groups.

13. The process of claim 9 wherein step (d12) is conducted until at least 90% of the hydroxyl groups in the monomer mixture M are consumed by reaction with the isocyanate component C2.

14. A process for the preparation of the aqueous polyurethane dispersion U of claim 1 by mixing at least one aqueously dispersible polyurethane U1 having a mass-average molar mass $M_{w1}$ of at least 10 kg/mol, and at least one aqueously dispersible polyurethane U2 having a mass-average molar mass $M_{w2}$ of less than 10 kg/mol, wherein the aqueously dispersed polyurethane U2 is made in a process comprising the steps of (a2)—providing a hydroxy-functional polycarbonate A2 of formula III

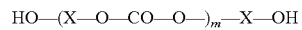

$$HO-(X-O-CO-O-)_m-X-OH \quad \text{Formula III,}$$

where X is a linear, branched or cyclic alkylene group, and m is an integer number, (b2)—mixing the polycarbonate A2 with a polyhydric alcohol E3 having at least three hydroxyl groups per molecule and a molar mass of less than 400 g/mol, and an organic acid B21 which is selected from the group consisting of hydroxy-functional organic acids and amino-functional organic acids, wherein the acid B21 has at least one hydroxyl or primary or secondary amino group and at least one acid group, (c2)—reacting the mixture prepared in step (b2) with at least one multifunctional isocyanate C3 having at least two isocyanate groups per molecule, wherein the amount of multifunctional isocyanate C3 is chosen such that there is a ratio of isocyanate groups in C3 to hydroxyl groups present in the mixture prepared in step (b) of from 2:1 to 1.1:1, until at least 90% of the hydroxyl groups of the mixture prepared in step (b1) are consumed by reaction with the multifunctional isocyanate C3, (d2)—cooling the reaction mixture of step (c2) to a temperature between 60° C. and 110° C., and adding least one hydroxyamine D having at least one primary or secondary amino group, and at least one hydroxyl group, and a base N2 in an amount of substance sufficient to neutralise at least 50% of the acid B21 used, and reacting until no more free isocyanate groups are detected, and (e2)—dispersing the reaction product of step (d2) in water, wherein the amounts of the reactants A2, B21, C3, D, N2, and E3 are chosen such that the resultant polyurethane U2 has a mass-average molar mass $M_{w2}$ of less than 10 kg/mol.

15. The process of claim 14, wherein in step (d2), the hydroxyamine component D comprises a mixture of a primary amine D1 having a hydroxyl group, and a secondary amine D2 having at least one hydroxyl group.

16. A method of use of the aqueous polyurethane dispersion U of claim 1 for the preparation of coating compositions, comprising the steps of admixing to the aqueous polyurethane dispersion U at least one additive selected from the group of wetting agents, defoamers, flow modifiers, antisettling agents, levelling agents, biocides, and coalescing agents, optionally pigments and colourants, to form a binder mixture, combining the binder mixture thus prepared with at least one crosslinking agent selected from the group consisting of capped and uncapped isocyanates, hydrophilically capped and uncapped isocyanates, aminoplast crosslinkers, alkoxycarbonylamino triazines, and phenoplast resins, and applying the mixture of binder and crosslinking agent to a substrate by spraying, dipping, brushing, blade coating, curtain coating or roller coating, and drying the coated substrate optionally at elevated temperature to form a coating film on the said substrate.

17. The method of use of claim 16 wherein the substrate is a thermoplastic material based on polycarbonates and their blends with acrylonitrile-butadiene-styrene terpolymers.

18. The process of claim 9, wherein in step (c12) the elevated temperature is from 60° C. to 150° C.

19. The process of claim 9, wherein in step e(12) the chain stopper F is added to the product of step (d12) within a period of up to five minutes.

* * * * *